Nov. 12, 1940.    R. A. FOLSOM    2,221,284
PIPE COUPLING
Filed Jan. 31, 1939
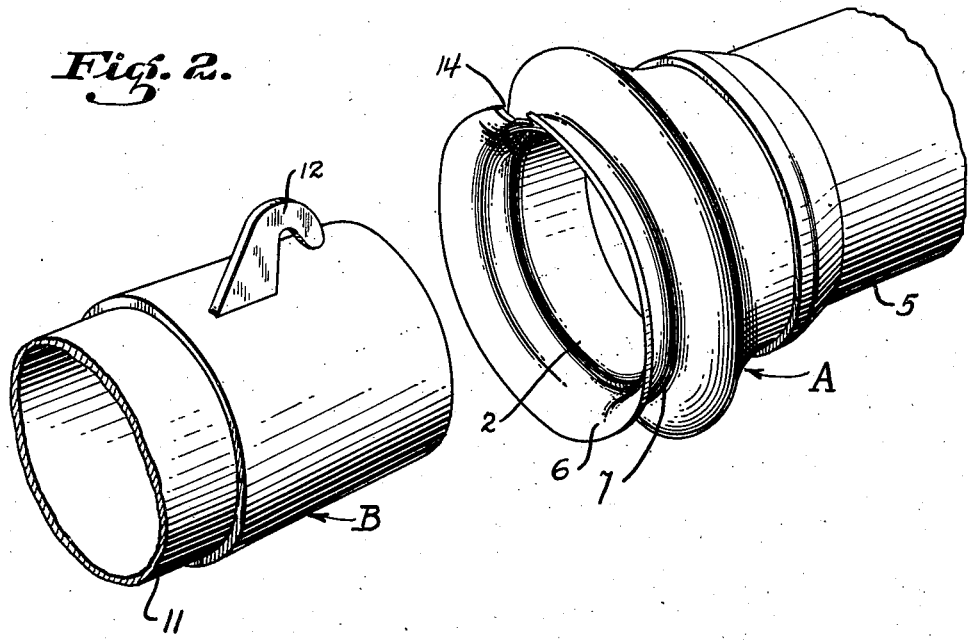
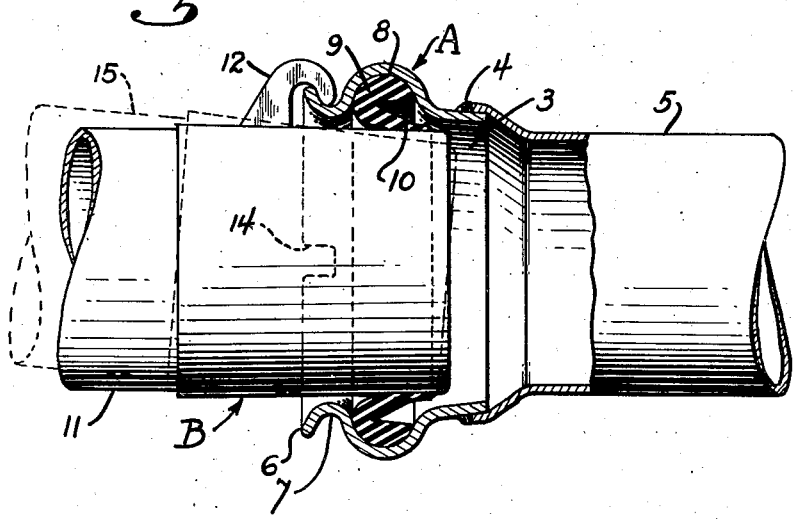
INVENTOR.
Rolf A. Folsom
BY Chas. E. Townsend.
ATTORNEY.

Patented Nov. 12, 1940

2,221,284

UNITED STATES PATENT OFFICE 2,221,284

PIPE COUPLING

Rolfe A. Folsom, Burlingame, Calif., assignor to W. R. Ames Company, San Francisco, Calif., a corporation of California Application January 31, 1939, Serial No. 253,759

1 Claim. (Cl. 285—175)

This invention relates to improvements in pipe couplings and especially to a quick interlocking or releasable coupling for use in connection with separable pipe such as used in irrigation work.

In the irrigation of land for the purpose of supplying water to growing crops, two general systems are employed, to-wit: a system in which the land is flooded with the water from irrigation ditches or pipes, and a system in which the water is applied by sprinkler heads or perforated sprinkler pipes. Where sprinkler pipe is used, a comparatively low water pressure, say from 8 to 10 pounds per square inch, is usually employed and the pipe is so perforated that water will be uniformly sprinkled over an area reaching about 17 to 18 feet on each side of the pipe. Water equal to one inch in depth is delivered in about half an hour, and as this is usually sufficient for one irrigation, the pipe should then be shifted to one side a distance of about 35 feet to sprinkle the adjacent area, this being repeated until the entire field or area has been covered. Plainly speaking, where sprinkler pipe is used, it is necessary to shift the pipe about once every half hour, and to facilitate such shifting, comparatively short lengths of pipe are used and the pipe must be provided with quickly detachable couplings; also, the couplings should be sufficiently flexible to permit the pipe to follow uneven contours and to permit the pipe to be laid in a curve when necessary.

The object of the present invention is to genenerally improve and simplify the construction and operation of couplings of the character described; to provide a pressure-tight coupling in which pipe to be coupled is inserted endwise in the coupling and slightly rotated to interlock the couplings; to provide a pressure-tight coupling in which the inserted pipe or coupling member is permitted a limited angular movement in any direction, so that the pipe may conform to irregularities in the ground formation and also be laid in a curve when necessary; to provide a coupling which is simple and rugged in construction and which will stand rough handling without danger of springing a leak; and, further, and more specifically stated, to provide a coupling one member of which consists of a bell-like housing carrying an automatically contracting gasket and having an annular groove formed adjacent its open end, and the other coupling member having a tapering end insertable in the open end of the first-named coupling to extend through the gasket, and said second coupling member having a hook-shaped member adapted to interlock with the annular groove of the first coupling member and at the same time permit angular movement of the inserted coupling member in any direction.

The coupling sections are shown by way of illustration in the accompanying drawing, in which:

Fig. 1 is a perspective view of one of the coupling members;

Fig. 2 is a perspective view of the cooperating coupling member; and

Fig. 3 is a longitudinal section of the coupling members showing them assembled and interlocked.

Referring to the drawing in detail, it will be noted that the pipe coupling consists of two members indicated at A and B, respectively. The coupling A comprises a bell-shaped housing terminating in a flaring, annular opening 2 at one end and in an annular flange 3 at the opposite end, whereby it may be riveted, welded, or otherwise secured, as indicated at 4, to the end of a pipe section 5. The flaring open end forms an annular flange 6 and beyond it an annular groove or depression 7. Intermediate said groove 7 and the flange 3 is formed an interior recess 8 in which is seated a gasket 9, this gasket being provided with an annular tongue 10 which is contractible during application of pressure, as will hereinafter be described.

The coupling section B comprises a tapering sleeve which is formed integrally with or welded on the end of a pipe 11. The sleeve is provided with a lug terminating on a hook 12, said lug and hook being welded or otherwise secured to the sleeve B.

The coupling member A, when mounted on the pipe section 5 in the manner described, and the coupling member B, when similarly secured to the pipe section 11, provide in effect an integral attaching means on each pipe section whereby the two sections may be readily coupled.

Whether the pipe is used for flooding the land to be irrigated or for sprinkling, it will be understood that comparatively short pipe lengths, for instance 15 to 20 feet long, are employed so as to facilitate the handling and lifting of the same. Also, it should be understood that each pipe length has a coupling member A on one end and a coupling member B on the opposite end.

When the pipe is to be coupled, the several sections of pipe are first laid on the ground in approximate positions, and they are then quickly and readily coupled, as all that is necessary is to grasp a pipe adjacent the coupling B, then to lift and insert it in the open, flaring end 2 of the coupling A. In the flaring flange 6 of the coupling A is formed a notch 14; this permits the hook 12 to pass through the flange 6 when the coupling B is inserted and at the same time it permits the hook 12 to move into register with the annular groove 7. Then, by slightly rotating the pipe or coupling B, for instance, a quarter turn or so, an interlock is formed between the two coupling sections, as the hook will then be out of register with the notch, or, in other words, behind the flange 6, and separation of the two coupling members is thus prevented when water pressure is applied.

During the insertion of the coupling section B it will also be noted that the inner end thereof passes through the annular tongue 10 of gasket 9, this tongue being relied on to provide a watertight seal about the coupling section B, as when water under pressure fills the pipe, pressure is exerted on the exterior face of the annular tongue, forcing it to tightly grasp the coupling B.

In actual practice it will be found that the coupling sections when coupled are flexible, that is, straight alignment between the pipe sections and couplings is not necessary, as the tapering end of the coupling B is considerably smaller in diameter than the interior annular faces of the coupling A. For this reason, pipe 11 and coupling B may assume different angular positions with relation to the coupling A, as indicated by dotted lines 15 in Fig. 3, thus permitting the pipe sections to conform to irregular ground formations when encountered, and also to be laid in a curve when this is found necessary or desirable. The hook 12 does not interfere with angular movements of the coupling sections with relation to each other, as it is free to swing vertically, horizontally, and, in fact, in any direction with relation to the flange 6; in fact, the hook functions as the universal coupler, as it permits movement of the coupling sections in any angular direction.

To disconnect the pipe sections, it is only necessary to rotate the pipe 11 until the hook registers with the notch 14; when such registration is accomplished the pipe or coupling section B is pulled out of the bell-shaped mount of the coupling A and the uncoupling is completed. Thus, uncoupling or coupling of the coupling sections is quickly and readily accomplished. The couplings when coupled are flexible and leakage is prevented at all times by the flexible annular tongue 10 of the packing gasket.

While this and other features of the present invention have been more or less specifically described and illustrated, I wish it understood that changes may be resorted to within the scope of the appended claim; similarly, that the materials and finish of the several parts may be such as the experience or judgment of the manufacturer may dictate or varying conditions may demand.

Having thus described my invention, what I claim and desire to secure by Letters Patent is:

In an irrigation system, a pair of pipe sections adapted to be coupled together in end-to-end relationship to provide a flexible joint whereby a relatively wide freedom of angular movement between the sections may be had, one end of one of said sections being of enlarged diameter and being formed with an outwardly flaring flange adapted to telescopically receive therein the adjacent end of the other pipe section, the former section having an annular groove formed behind the outwardly flared flange and said flange having a notch formed therein, the minimum diameter of the enlarged portion of the former section being materially greater than the maximum overall diameter of the other section throughout the entire extent of the telescopic overlap whereby said last-mentioned section is out of engagement with the other section and the two sections are capable of a relatively large degree of independent angular movement one relative to the other, a hook member carried by the section whose end is of smaller diameter, said hook member being adapted to pass through the notch in the outwardly flaring flange to register with said annular groove, said hook member having a bight portion slightly wider than the thickness of the flange to enhance relative angular movement between the sections, said hook member and flange forming the sole means for restricting telescopic movement between the pipe sections.

ROLFE A. FOLSOM.